United States Patent
Choi et al.

(10) Patent No.: US 6,179,491 B1
(45) Date of Patent: Jan. 30, 2001

(54) METHOD AND APPARATUS FOR SLICING CLASS HIERARCHIES

(75) Inventors: Jong-Deok Choi, Mount Kisco, NY (US); John H. Field, Middlebury, CT (US); Ganesan Ramalingam, Croton-on-Hudson; Frank Tip, Mount Kisco, both of NY (US)

(73) Assignee: International Business Machines Corporation, Armonk, NY (US)

( * ) Notice: Under 35 U.S.C. 154(b), the term of this patent shall be extended for 0 days.

(21) Appl. No.: 08/794,986

(22) Filed: Feb. 5, 1997

(51) Int. Cl.[7] .................................................. G06F 9/45
(52) U.S. Cl. ........................................... 395/704; 395/703
(58) Field of Search ................................. 395/704, 709, 395/702, 703

(56) References Cited

U.S. PATENT DOCUMENTS 5,652,899 * 7/1997 Mays et al. .......................... 707/512

OTHER PUBLICATIONS

Chen, Xiaoping; Tsai, Wei–Tek; Huang, Hai; Poonawala, Mustafa; Rayadurgam, Sanjai; Wang, Yamin; Omega—an Integrated Environment for C + + Program Maintenance; Proceedings of the 1996 IEEE Conference on Software Maintenance; pp. 114–123, 1996.*
ACM Transactions on Programming Languages and Systems, vol. 12, No. 1, Jan. 1990, pp.26–60 "Interprocedural Slicing Using Dependence Graphs", S. Horwitz, T. Reps and D. Brinkley, University of Wisconsin–Madison.
IEEE Transactions on Software Engineering, vol. SE–10, No. 4, Jul. 1984, pp. 352–357,"Programming Slicing", Mark Weiser.
SIGPLAN 94–6/94 Orlando, Florida, pp. 302–312, On Slicing Programs with Jump Statements, H. Agrawal, Bellcore, Morristown, NJ.
Journal of Programming Languages 3 (1995) 121–189, pp. 121–189 "A Survey of Program Slicing Techniques", Frank Tip, IBM, T.J. Watson Research Center, Yorktown Heights, NY.
OOPSLA 94–10/94 Portland, Oregon USA, Sifting Out the Gold, Delivering Compact Applications from an Exploratory Object–Oriented Programming Environment, Ole Agesen, David Ungar, pp. 355–369.
Proceedings of ICSE–18, Mar. 1996, Berlin, pp. 495–505 "Slicing Object–Oriented Software", L. Larsen and M. J. Harrold, Clemson University.
Computer Sciences Dept. University of Wisconsin, pp. 206–222, Slicing Programs with Arbitrary Control–Flow T. Ball and S. Horwitz.
POPL '95 1/95 San Francisco, CA, pp. 379–392, "Parametric Program Slicing", J. Field, G. Ramalingam, IBM, T.J. Watson Research Center, Yorktown Heights, NY.
Proceedings of the ACM Fourth Symposium on Testing, Analysis, and Verification (TAV4), Victoria, British Columbia, Canada, Oct. 8–9, 1991, pp. 60–73, "Dynamic Slicing in the Presence of Unconstrained Pointers", H. Agrawal, Bellcore; R. DeMillo, E. Spafford, Purdue University.

(List continued on next page.)

Primary Examiner—Tariq R. Hafiz
Assistant Examiner—Brian Sattizahn
(74) Attorney, Agent, or Firm—Jay P. Sbrollini

(57) ABSTRACT

Given a class hierarchy (a collection of classes and inheritance relations among them) and a program P that uses the hierarchy, a slice of the class hierarchy is computed with respect to the program by eliminating from the hierarchy those data members, member functions, classes, and inheritance relations that are unnecessary for ensuring that the semantics of P is maintained.

26 Claims, 10 Drawing Sheets

OTHER PUBLICATIONS

Microsoft Research Advanced Technology Division, Technical Report MSR–TR–94–14, Jul. 26, 1994, "Practical Fine–Grained Static Slicing of Optimized Code", Michael Ernst.

"Program Slicing", pp. 1–31, Panos Livadas, Stephen Croll, Computer and Information Sciences Dept., University of Florida.

Thomas Reps, Susan Horwitz and Mooly Sagiv, University of Copenhagen; Genevieve Rosay, University of Wisconsin–Madison, pp. 1–13, "Speeding up Slicing".

ACM Letters on Programming Languages and Systems, vol. 1, No. 4, Dec. 1992, pp. 355–364 "Unreachable Procedures in Object–Oriented Programing", Amitabh Srivastava, Digital Equipment Western Research Laboratory.

Dept. of Computer Science, Clemson University, pp. 1–38, "Program Slicing: An Application of Object–Oriented Program Dependency Graphs", A. Krishnaswamy.

OOPSLA '96 CA, "Slicing Class Hierarchies in C++", F. Tip, J–D. Choi, J. Field, G. Ramalingam, IBM T.J. Watson Research Center, Yorktown Heights, NY, PP. 179–197.

* cited by examiner

Fig. 6A

Classes

| 601 | 603 |
|---|---|
| A | ✓ |
| B | ✓ |
| C | ✓ |
| D | ✓ |
| S | ✓ |
|   |   |

Fig. 6B

Members

| 605 | 607 | 609 |
|---|---|---|
| A | x | ✓ |
| S | foo | ✓ |
| S | bar |   |
| S | y |   |
| B | foo | ✓ |
| C | bar | ✓ |
|   |   |   |

Inheritance Relations

Fig. 6C

| 611 | 613 | 615 |
|---|---|---|
| B | A | ✓ |
| C | A |   |
| B | S | ✓ |
| C | S | ✓ |
| D | B | ✓ |
| D | C | ✓ |
|   |   |   |

Classes

| | |
|---|---|
| A | ✓ |
| B | ✓ |
| C | ✓ |
| D | ✓ |
| S | ✓ |
| | |

Members

| | | |
|---|---|---|
| A | x | ✓ |
| S | foo | ✓ |
| S | bar | |
| S | y | |
| B | foo | ✓ |
| C | bar | |
| | | |

Inheritance Relations

| | | |
|---|---|---|
| B | A | ✓ |
| C | A | |
| B | S | ✓ |
| C | S | ✓ |
| D | B | ✓ |
| D | C | ✓ |
| | | |

Fig. 7D

METHOD AND APPARATUS FOR SLICING CLASS HIERARCHIES

BACKGROUND OF THE INVENTION

1. Field of the Invention

The present invention generally relates to object oriented programming (OOP) systems, and, more particularly, to OOP systems supporting the C++ programming language.

2. Background Description

The C++ programming language provides a number of features such as classes, inheritance, multiple inheritance, and virtual inheritance. These object oriented features have several advantages. Most importantly they enable the creation of class libraries that can be reused in several different applications. However, such code reuse comes at a price. To enable reusability, object oriented programming encourages the use of classes that incorporate a high degree of functionality. Programs that use such classes, however, may pay a penalty for functions they do not use. One of the resulting penalties is that of increased code size resulting from linking unused functions. The prior art has focused on addressing this penalty. An example of such prior art is A. Srivastava, "Unreachable procedures in object oriented programming", ACM Letters on Programming Languages and Systems, 1(4), pp. 355–364, December 1992.

Other prior art has focused on determining unused code at the statement level. In particular, program slicing techniques have been developed for isolating computational threads in programs. A program slice is generally defined as the set of statements that either contribute to, or are affected by, the values computed at some designated point of interest in the program. A more detailed description of program slicing may be found in F. Tip, "A Survey of Program Slicing Techniques", Journal of Programming Languages 3, 3 (1995), pp. 121–189. The combination of a program point and a set of variables of interest at that point is referred to as the slicing criterion. In particular, previous work on program slicing has focused on eliminating from a program those executable statements that are unnecessary with respect to the given slicing criterion.

However, a less obvious penalty of the use of class libraries in object oriented programming is that objects may contain unnecessary data members and subjects. Larger objects can not only increase the space requirements of the program, but also decrease its execution speed, due to the extra time required for object construction and destruction, and the effects of paging and caching. The presence of unused or unnecessary data members and inheritance relations in a program has another disadvantage as well. It makes it unnecessarily more difficult for programmers to understand the code.

SUMMARY OF THE INVENTION

The problems presented above and the related problems of the prior art are solved by the present invention, method and apparatus for slicing class hierarchies. The present invention computes a slice of a given class hierarchy of a program P by eliminating from the hierarchy those data members, member functions, classes, and inheritance relations that are unnecessary for ensuring that the semantics of P is maintained. The invention may be used in optimization by reducing the space and time requirements of a program. In the alternative, the invention may be used in program understanding and debugging. The invention is preferably used subsequent to program slicing.

BRIEF DESCRIPTION OF THE DRAWINGS

FIGS. 6(A)–(C) illustrate a data structure for storing data that identifies a class hierarchy slice.

FIGS. 7(A)–(D) illustrates an exemplary class hierarchy slice generated by the class slicing technique of the present invention.

DETAILED DESCRIPTION OF THE INVENTION

Figure 1:
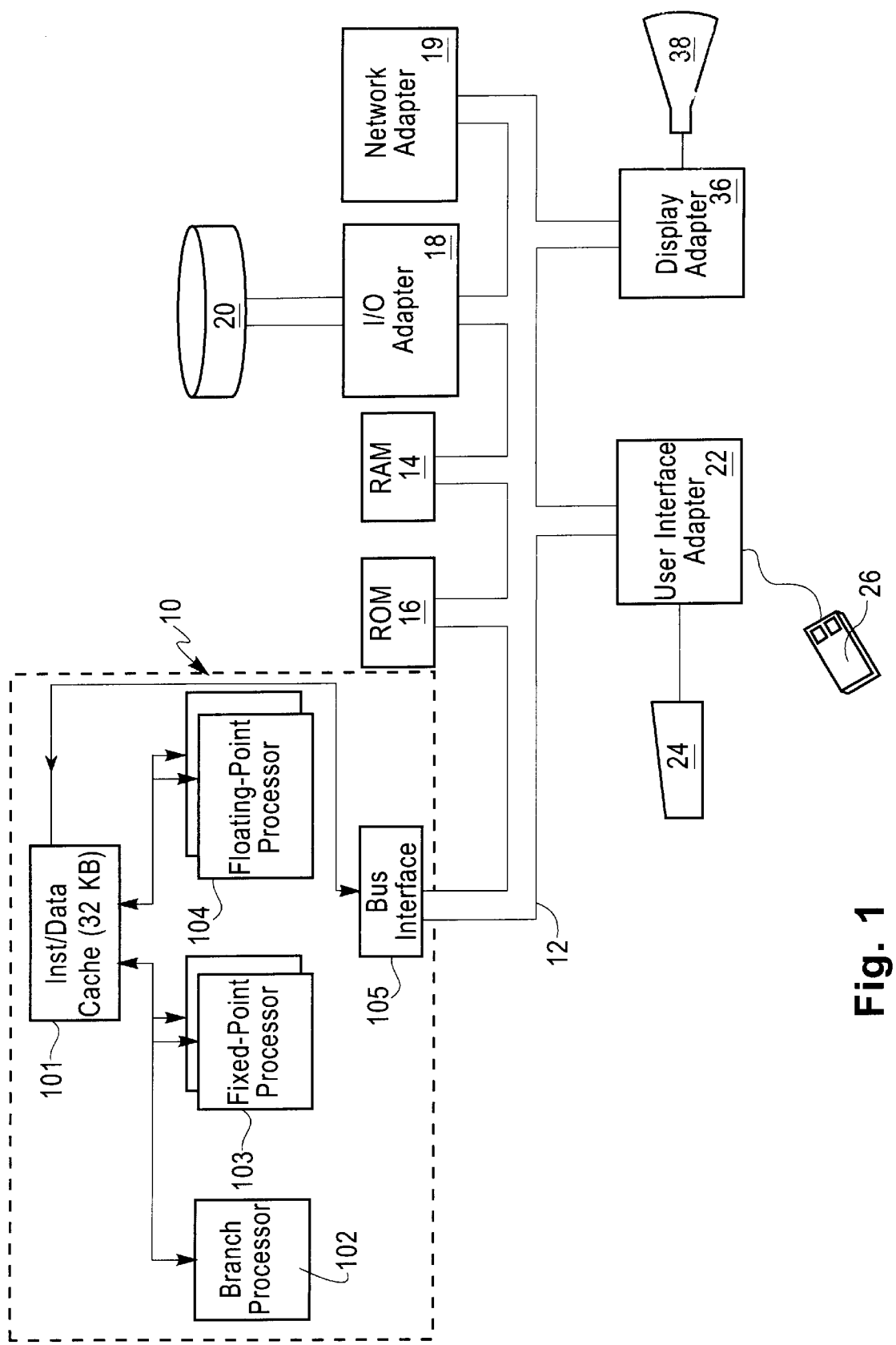
FIG. 1 is a block diagram illustrating a hardware configuration on which the subject invention may be implemented.

Referring now to the drawings, and more particularly to FIG. 1, there is shown a representative computer processing apparatus on which the subject invention may be implemented. The computer processing apparatus includes a central processing unit (CPU) 10 and an instruction cache and data cache, which may be combined into a single cache 101 as shown. The instruction cache stores instructions to be executed by the CPU 10. The data cache stores data to be used in the execution of such instructions. The CPU 10 includes a plurality of execution units. The execution units may include a branch processor 102, one or more integer units (FXU) 103, and one or more floating point units (FPU) 104 as shown. The branch processor 102 executes branch instructions issued from the instruction cache. The FXU 103 executes integer based instructions issued from the instruction cache. And the FPU 104 executes floating point instructions issued from the instruction cache. The computer processing apparatus may also include additional execution units (not shown), for example a multimedia execution unit, for executing varying sets of instructions issued from the instruction cache. The instruction and data caches communicate with the bus interface 105.

The CPU 10 is attached to a system bus 12 to which are attached a random access memory (RAM) 14, a read only memory (ROM) 16, an input/output (I/O) adapter 18, and a user interface adapter 22. Typically, the user interface adapter 22 has attached to it a keyboard 24, a mouse 26, and/or other user interface devices such as a touch screen device (not shown). Such a touch screen device would optionally be installed on the display 38, here represented as a cathode ray tube (CRT) display but which may be a liquid crystal display (LCD) or other suitable display device. The display 38 is connected to the system bus 12 via a display adapter 36.

The computer system's operating system (and other utilities), application program code and data are stored in persistent memory and temporarily loaded into RAM 14 for execution by the CPU 10. The persistent memory is typically provided by a disk drive 20 coupled to the CPU via an I/O adapter 18. In addition, persistent memory may be provided by resources coupled to the CPU 10 via the system bus and a network adapter 19. In this case, portions of the computer system's operating system (or other utilities), and portions of the application program code and data may be retrieved from network resources and loaded into RAM 14 for execution by the CPU 10.

In order to better understand the invention, some background material is presented regarding the notion of class hierarchies and subobjects in object-oriented programming languages such as C++.

A class hierarchy specifies the following:

a set of classes;

for every class, a set of members which may be either data members or member functions; further, a member function may be either a virtual function or non-virtual function;

the inheritance relations among the classes; in particular, for every class, the set of base classes it inherits from is specified. The inheritance may be further qualified as a virtual or non-virtual inheritance.

As an example, consider the class hierarchy specified by the following C++ code:

```
class S {
public:
        int y;
        virtual void foo();
        void bar();
};
class A {
public:
        int x;
};
class B : public A, public virtual S {
public:
        virtual void foo();
};
class C : public A, public virtual S {
public:
        void bar();
};
class D : public B, public C {
};
```

In this example, the class hierarchy consists of the following components:

CLASSES

S, A, B, C, and D

MEMBERS class S has (data) member y class S has virtual member (function) foo class S has nonvirtual member (function) bar class A has (data) member x class B has virtual member (function) foo class C has nonvirtual member (function) bar class D has no members of its own

INHERITANCE RELATIONS class B inherits nonvirtually from class A class B inherits virtually from class S class C inherits nonvirtually from class A class C inherits virtually from class S class D inherits nonvirtually from class B class D inherits nonvirtually from class C Given a class hierarchy and a program that uses the class hierarchy, the techniques described here can be used to identify components of the class hierarchy that are necessary to preserve the program's execution behavior and to compute a slice of the class hierarchy that omits any unnecessary classes, members and inheritance relations.

C++ classes are essentially descriptions of objects or class instances that may be created during program execution. Let us say a class X inherits from a class Y. The essential meaning of this inheritance relation is that every instance (object) of class X will contain an instance (object) of class Y. Consider the class hierarchy described above, which consists of 5 classes A, B, C, D, and S. Class B inherits from both classes A and S. Consequently, every B object will contain an A subobject as well as an S subobject. Similarly, C also inherits from both A and S. Hence, every C object will also contain an A subobject as well as an S subobject.

Figure 3:
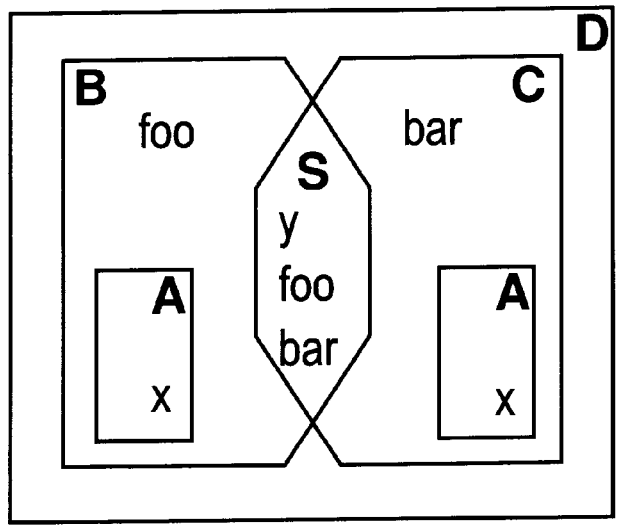
FIG. 3 is a pictorial illustration depicting the structure of an object D.

There are some differences between virtual and non-virtual inheritance, which is illustrated by the structure of a D object as shown in FIG. 3. Consider class D. Since D inherits from B and C, every D object will contain a B object as a subobject and a C object as a subobject. Of course, the B subobject contained within a D object will itself, in turn, contain an A subobject and an S subobject. Similarly, the C subobject contained within a D object will itself, in turn, contain a A subobject and a S subobject. However, since B and C inherit virtually from S, both the B subobject contained within a D object and the C subobject contained within the same D object will share a single unique S subobject. In contrast, since B and C inherit non-virtually from A, each of the B and C subobjects contained within a D object contain their own A subobject. FIG. 3 depicts the structure of an object of type D. Observe that, due to the use of a combination of virtual and non-virtual inheritance, an object of type D contains a single subobject of type S, but two distinct subobjects of type A each of which have a distinct data member x.

For the sake of clarity, the following naming scheme will be used to refer to the various subobjects. In general, every subobject can be given a name of the form $[Z; X_i, X_{i-1} \ldots X_2, X_1]$ where $X_i$ is a (direct or indirect) virtual base of Z and $X_{i-1} \ldots X_1$ is the sequence of class names where $X_j$ is a direct non-virtual base of $X_{j+1}$. Thus, the sequence denotes the $X_1$ subobject contained within the $X_2$ subobject contained within the $X_3$ subobject, and so on, contained within the $X_{i-1}$ subobject contained within the unique $X_i$ subobject contained within a Z object. The most derived class of such a subobject is Z, and the least derived class of such a subobject is $X_1$. For example, the A subobject contained within the B subobject contained within a D object is referred to as the [D; D.B.A] subobject. Likewise, [D; D.C.A] denotes the A subobject contained within the C subobject contained within a D object. As explained above, there is an unique S subobject within a D subobject since both B and C inherit virtually from S. This unique subobject is referred to as [D; S]. A more detailed description of the naming scheme may be found in J. Rossie and D. Friedman, "An algebraic semantics of subobjects", Proceeding of the Tenth Annual Conference on Object-Oriented Programming Systems, Languages and Applications (OOPSLA '95), Austin, Tex., 1995, pp. 187–199.

One defines the concept of immediately contained subobject as follows. For the example presented above, [D; D.B] and [D; D.C] are immediately contained subobjects of [D; D]; while [D; D.B.A], [D; D.C.A], and [D; S] are not immediately contained subobjects of [D; D], yet they are indirectly contained subobjects of [D; D].

Figure 4:
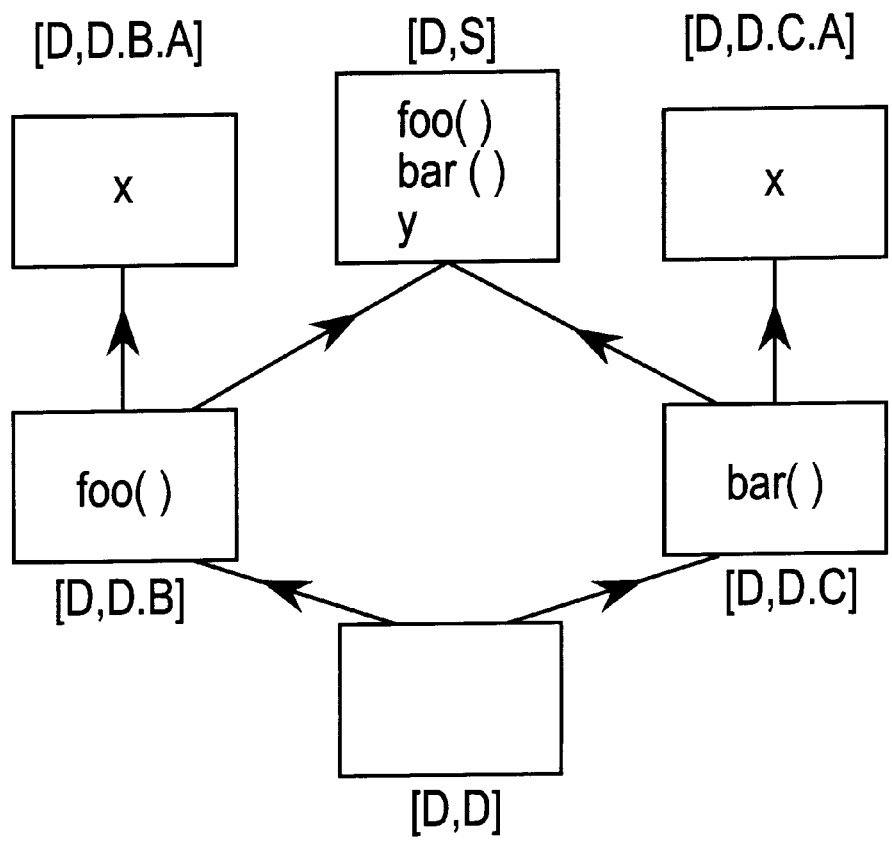
FIG. 4 is a subobject graph for the type D of FIG. 3.

The layout of objects can be depicted conveniently using a graph-based representation called the subobject graph. The subobject graph consists of a node for every subobject. Edges in the graph denote "immediate containment". In particular, the graph includes an edge from a subobject n to another subobject n' iff n' is an immediately contained subobject of n. FIG. 4 shows the subobject graph for type D. That is, it shows only the part of the graph consisting of all subobjects of most-derived class D.

A subobject contains a member m if the least derived class of that subobject has a member m. Let n' be a subobject contained within another subobject n. Further, let n' contain a member m. The member m of the subobject n' is visible in n if there exists a sequence of subobjects $n_1$ to $n_k$ such that $n'=n_1$, each $n_i$ is immediately contained in $n_{i+1}$, and $n_k=n$, and none of the $n_i$ other than $n_1$ contains a member m. Otherwise, the member m of n' is said to be hidden in n. The set VisibleDefs (n; m) is defined to be the set of all subobjects contained in n that have a member m that is visible at n.

Figure 5:
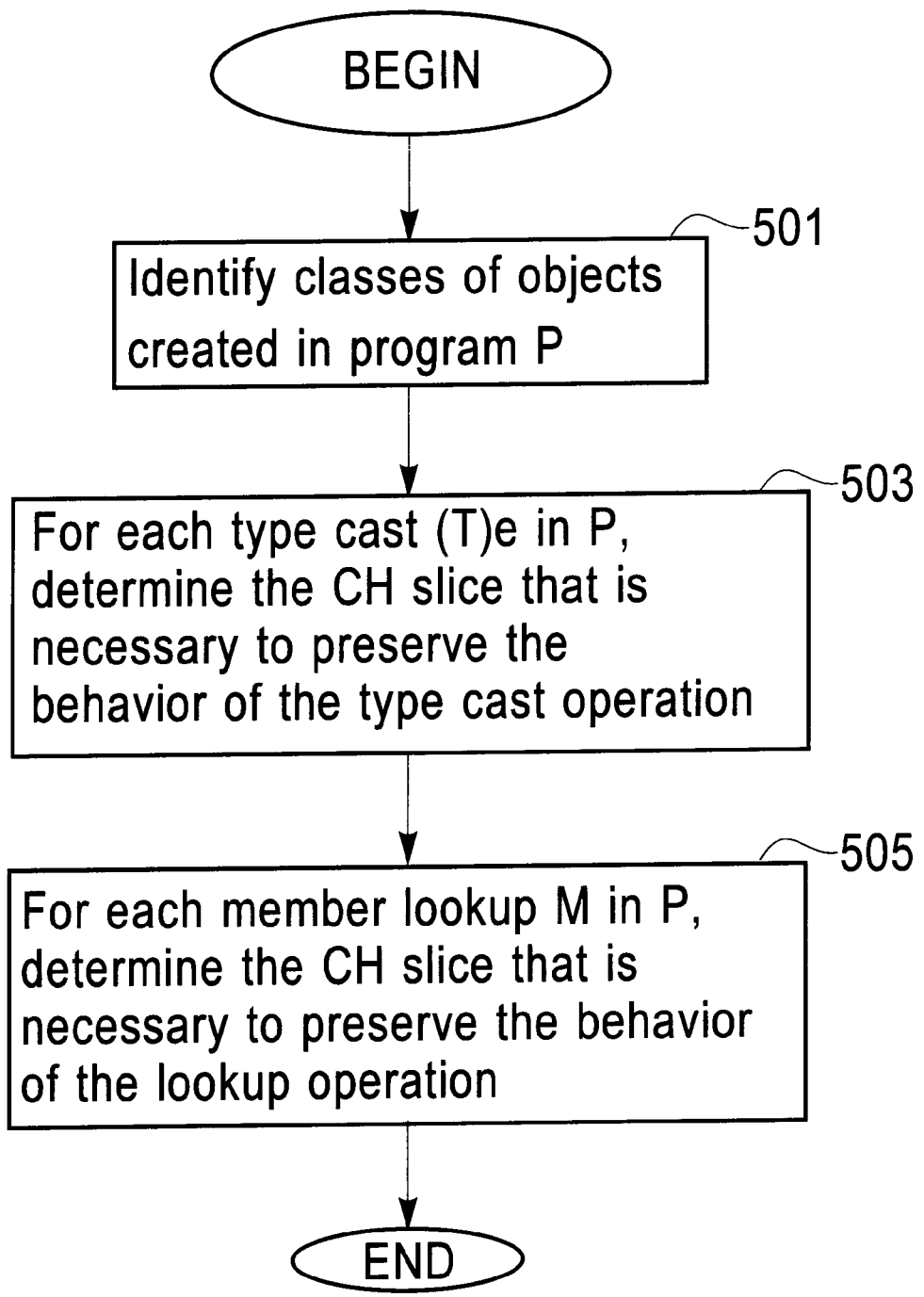
FIG. 5 is a flow chart illustrating the class slicing technique of the present invention.

The method for computing a class hierarchy slice according to the present invention is shown in FIG. 5. The operation begins in step 501 by identifying the classes of objects created in the given program P. In step 503, for each type-cast in the program P, class hierarchy slice data that identifies the part of the class hierarchy that is necessary to preserve the behavior of the type cast operation is generated and stored in persistent storage for subsequent use. Finally, in step 505, for every member lookup operation in the program P, class hierarchy slice data that identifies the part of the class hierarchy that is necessary to preserve the behavior of the member lookup operation is generated and stored in persistent storage for subsequent use.

FIGS. 6(A)–(C) illustrate an example of a data structure for storing data that identifies a class hierarchy slice. FIG. 6(A) illustrates a table for storing data that identifies the classes of a class hierarchy slice. The table includes a plurality of entries each corresponding to a class of objects in the program P. Each entry includes a first field 601 that identifies the associated class. For example, the first field 601 may store the name of the associated class. The entry may also include a second field 603 that identifies whether or not the associated class is part of the class hierarchy slice. FIG. 6(B) illustrates a table for storing data that identifies the members of a class hierarchy slice. The table includes a plurality of entries each corresponding to a member in the program P. Each entry includes a first field 605 and a second field 607. The first field 605 identifies the class for the associated member. The second field 607 identifies the associated member. For example, the first field 605 may store the name of the associated class and the second field 607 may store the name of the associated member. The entry may also include a third field 609 that identifies whether or not the associated member is part of the class hierarchy slice. FIG. 6(C) illustrates a table for storing data that identifies the inheritance relations of a class hierarchy slice. The table includes a plurality of entries each corresponding to an inheritance relation between a pair of classes, wherein one of the classes of the pair (i.e., the derived class) is derived, either through virtual or non-virtual inheritance, from the other class of the pair (the base class). Each entry includes a first field 611 and a second field 613. The first field 611 and the second field 613 identify the associated derived class and base class, respectively. For example, the first and second fields 611,613 may store the name of the associated derived class and base class, respectively. The entry may also include a third field 615 that identifies whether or not the associated inheritance relation is part of the class hierarchy slice. Those skilled in the art will realize that the data structures of FIGS. 6(A)–(C) are exemplary, and that there exist many other data structures that may be used to store the class hierarchy slice data; all of which may be used with the present invention.

A more detailed description of the method of steps 501 to 505 is set forth in the following pseudo-code:

```
/* top-level function: computes a class hierarchy slice (slice) for a given program P */
[1]  function Slice (Program P) : hierarchy;
         /* Initialize the slice to be empty */
[2]      let slice be the empty set;
         /* Determine which classes are needed due to object creation constructs */
         /* (i.e, declarations and applications of the 'new' operator) */
[3]      for each (implicit or explicit) object creation construct e in P do
[4]          Add to slice the class instantiated by e;
[5]      end for
         /* Add to slice parts of the hierarchy that are needed for executing type casts */
[6]      for each (implicit or explicit) upcast expression (T*) e or (T&) e or (T) e in P do
[7]          Let T' be the static type of expression e;
[8]          Add to slice all classes and inheritance relations that lie "between" classes T'
             and T;
[9]      end for
/* Add to slice parts of the original class hierarchy that are needed for member lookups */
[11]     for each member selection expression e.m or e → m in P do
[12]         Let runTimeTypes(e) be the set of potential run-time types that e may assume
             during execution of P;
[13]         Let staticType be the static type of e;
[14]         SubObjSet = CorrespondingSubobjects(runTimeTypes(e),  staticType);
[15]         for each subobject n in SubObjSet do
[16]             MemberLookupSlice (n; m);
[17]         end for
[18]     end for
[19]     return slice;
[20]  end;
/* Determine all subobjects whose most derived class is a class in T and whose least derived
*/
/*       class is X */
[21]  function CorrespondingSubobjects(TypeSet  T ; Class X): SubObjectSet;
[22]      SubObjSet = 0;
[23]      for each class C in the set T do
```

-continued

```
[24]        Add to SubObjSet all subobjects whose most derived class is C and
            whose least derived class is X;
[25]    end for
[26]    return SubObjSet;
[27] end;
```

In step 501, the identification of the classes of the objects in the program P is preferably performed by initializing sliced class hierarchy data to be empty (line [2]), determining which classes are needed due to object creation constructs, and adding such classes to the sliced class hierarchy data (lines [3]–[5]). A class X is said to be instantiated when an object of type X (i.e., an instance of the subobject [X; X]) is created. Objects may be created through the use of various program constructs. For example, in C++, objects may be created through the use of a new operator (e.g., "new X") and variable definitions (e.g., "X x;"). In addition, programs typically have a number of implicit constructs: constructs that are generated by the compiler if the programmer omits them. For instance, a constructor for a class may contain implicit instantiations of all its data members. These are all considered to be class instantiations as well.

In step 503,the parts of the hierarchy that are needed for executing type casts are preferably added to the class slice hierarchy data by identifying all upcasts in the program P (line [6]); and, for each upcast, adding the parts of the class hierarchy corresponding to the upcast to the class slice hierarchy data (lines [7]–[9]). A type cast may be an upcast or a downcast. A typecast from a class F to a class T is said to be a upcast if F is a derived class of T and a downcast if T is a derived class of F.

Preferably, both implicit and explicit upcast expressions are identified in step 503. An explicit typecast is one included in the program by the programmer. An implicit typecast is one introduced into the program by the compiler. For example, if the program uses a pointer to class X in a context where a pointer to a class Y is expected, and X is a derived class of Y, then the compiler automatically inserts a typecast here from class X to class Y.

In addition, in step 503, the part of the class hierarchy that corresponds to a given upcast from a class F to a class T is preferably the part of the class hierarchy that lies between classes F and T. Thus, the part of the class hierarchy that corresponds to an upcast from a class F to a class T includes:

1) the classes F and T;
2) any class Z such that
    i) Z is a derived class of T (either directly or indirectly); and
    ii) F is a derived class of Z (either directly or indirectly);
3) any inheritance relations that exist between any of the classes identified in 1) and 2).

In step 505, the member lookup operations, denoted e.m or e→m, in the program P are identified and, for each member lookup operation, the part of the class hierarchy that is necessary to preserve the behavior of that member lookup operation is determined. Because the behavior of the lookup operation depends on the subobject on which the lookup is performed, step 505 is preferably partitioned into the following two tasks:
  (i) identify the set SubObjSet of possible subobjects that e may denote at this program point; and
  (ii) for each possible subobject n in the set SubObjSet, identify the part of the class hierarchy that is necessary to preserve the behavior of a lookup for member m on subobject n.

In order to perform the first task i) of step 505 (i.e., identifying the set SubObjSet of possible subobjects that e may denote at this program point), the operation preferably begins by identifying the least derived class of any subobject that e may denote: this is simply the static type of e (line [13]). This can be computed using standard compiler analysis techniques. The second step is to identify the possible most derived classes of any subobject that e may denote, which can be done using any one of several known type inference algorithms as described in D. F. Bacon, M. Wegman, and F. K. Zadeck, "Rapid type inference for C++", Technical Report RC 1234, IBM Thomas J. Watson Research Center, 1995; M. F. Fernandez, "Simple and effective link-time optimization of modula-3 programs", Proceedings of the ACM SIGPLAN '95 Conference on Programming Language Design and Implementation, pages 103–115, June 1995; David F. Bacon and Peter F. Sweeney, "Past static analysis of C++ virtual function calls", Proceeding of the Eleventh Annual Conference on Object-Oriented Programming Systems, Languages and Applications (OOPSLA '96), San Jose, Calif., 1996, pp. 324–341; J. Dean and C. Chambers, "Optimization of object-oriented programs using static class hierarchy analysis", Technical Report 94-12-01, Department of Computer Science, University of Washington at Seattle, December 1994; Hemant D. Pande and Barbara G. Ryder, "Static type determination and aliasing for C++", Report LCSR-TR-250-A, Rutgers University, October 1995; and Paul R. Carini, Michael Hind, and Harini Srinivasan, "Flow-sensitive type analysis for C++", Technical Report RC 20267, IBM T.J. Watson Research Center, 1995, and J. Dean and C. Chambers, "Optimization of Object-Oriented Programs Using Static Class Hierarchy Analysis", Tech. Rep. 94-12-01, Department of Computer Science, University of Washington at Seattle, December 1994, herein incorporated by reference in their entirety. Finally, after determining the least derived class and the set of possible most derived classes, for each combination of the least derived class and most derived class, the set of all subobjects with the combination can be identified from the subobject graph. For example, suppose that for a given expression e in the class hierarchy presented above, the least derived class is class A and the set of most derived classes is class D and class C. Then, for the combination of class D and class A, the set of subobjects includes the subobject [D; D.B.A] and the subobject [D; D.C.A]. For the combination of class C and class A, the set of subobjects consists of the set containing the sole subobject [C; C.A].

The second task ii) of step 505 identifies, for each possible subobject n in the set SubObjSet, the part of the class hierarchy that is necessary to preserve the behavior of a lookup for member m on subobject n. An example of the substeps of step 505 is illustrated in the following pseudo-code:

```
/* Determine the parts of the hierarchy necessary for a lookup of member m from subobject n
*/
[101]  procedure MemberLookupSlice (Subobject n; member m);
[102]       n' = biggest (VisibleDefs (n; m) );
[103]       Add to slice the parts of hierarchy "between" subobjects n and n';
[104]       Let C be the least derived class of n';
[105]       Add member C::m to slice;
[106]       for each subobject n" in VisibleDefs (n; m) do
[107]            Add to slice the parts of hierarchy "between" subobjects n' and n";
[108]       end for
[109]       if member m in class C is a virtual method then  /* virtual member lookup */
[110]            Let D be the most derived Class of n;
[111]            Let n_full be the subobject [D; D];
[112]            n' = biggest (VisibleDefs (n_full; m));
[113]            Add to slice the parts of hierarchy "between" subobjects n_full and n';
[114]            Let C be the least derived class of n';
[115]            Add C::m to slice;
[116]            for each subobject n" in VisibleDefs (n_full; m) do
[117]                 Add to slice the parts of hierarchy "between" subobjects n'
                      and n";
[118]            end for
[119]       end if
[120]  end;
/* VisibleDefs finds all "visible definitions" of a member m in a given subobject. */
[121]  function VisibleDefs(subobject n, member m): SubObjectSet;
[122]       if (the least derived class of n contains a definition of member m) then
                 /* If the static class of n contains a definition of m */
                 /* then this is the only visible definition, because it hides all */
                 /* other definitions of m */
[123]            S = {n };
[124]       else
                 /* Otherwise, subobject n doesn't have a definition of m itself, and */
                 /* we go "up" in the subobject graph to all "parent nodes" */
                 /* of n, and look for visible definitions there */
[125]            S = φ; /* the empty set */
[126]            for each immediately contained subobject n' of n do
[127]                 S := S ∪ VisibleDefs (n' ; m);
[128]            end for
[129]       end if
[130]       return S;
[131]  end;
/* given a set of subobjects that contain a member m, this function will select the
"dominating" definition*/
[132]  function biggest(SubObjectSet S) : SubObject
[133]       BSO = the subobject n in S such that every n' in S is contained within n
[134]  return BSO;
[134]  end;
```

First, a "static lookup" is performed on the specified subobject for the specified member. This is done by computing the "biggest" subobject of the set VisibleDefs (n; m). Recall that VisibleDefs (n; m) returns the set of all subobjects contained within the subobject n that have a member named m that is visible at the subobject n. Here, a subobject n' is said to be the "biggest" subobject in a set S of subobjects if every subobject in S is directly or indirectly contained within n'. Assume that the result of this "lookup" is a subobject n' of least derived class C. In this case, the following components of the class hierarchy are added to the class hierarchy slice data being computed:

the first component added to the class hierarchy slice data is the part of the hierarchy that lies between-subobjects n and n', which may be determined by first identifying the set of subobjects that lie between subobjects n and n': This set includes the subobjects n, n', as well as any other subobject $n_{mid}$ such that n' is a subobject contained in n $_{mid}$ and $n_{mid}$ is a subobject contained in n. Let R denote this set of subobjects. Then, for every subobject in the set R, the least derived class of the subobject is added to the class hierarchy slice data. In addition, for any two subobjects n1 and n2 in R such that n2 is an immediate subobject of n1, the corresponding inheritance relation between the least derived classes of n1 and n2 is added to the class hierarchy slice data. (line [103].)

the member m in the least derived class of n' is added to the class hierarchy slice data (Lines [104]–[105].)

for every subobject n" in the set VisibleDefs (n; m), the part of the hierarchy that lies between subobjects n' and n" is added to the class hierarchy slice data (Lines [106]–[108]).

If the member m is a non-virtual member in the least derived class of n', the operation is complete.

However, if the member m is a virtual method, additional steps are performed. More specifically, let D denote the most derived class of n. Then, the "full" subobject containing n may be denoted [D; D], which is the biggest subobject that contains n. We will henceforth refer to this full subobject as $n_{full}$. The operation begins by performing a "lookup" on $n_{full}$ for m, which is accomplished by identifying the biggest subobject among all the subobjects contained within $n_{full}$ that have a member named m (step [112]). Assume that the lookup returns a subobject n' of least derived class C. In this case, the following components of the class hierarchy are added to the class hierarchy slice data being computed:

the part of the hierarchy that lies between subobjects $n_{full}$ and n' (line [113]);

the member m in the least derived class of n' (Lines [114]–[115].)

for every subobject n" in the set VisibleDefs (n$_{full}$; m), the part of the hierarchy that lies between subobjects n' and n" is added to the class hierarchy slice data (Lines [116]–[118]).

Given a subobject n and a member m, the finction Visible-Defs (lines [121]–[131]) determines a set of subobjects n' that are (directly or indirectly) contained in n and whose least derived class has a member m. Specifically, the operation works as follows. If subobject n itself contains a member m (line [122]), then the member m in subobject n is the only visible definition because it hides all other definitions of m in subobjects n' that are contained in subobject n (line [123]). Otherwise, if subobject n does not have a definition of member m in itself, any definition of member m that is visible in an immediately contained subobject n' is visible in n as well (lines [125]–[128]). A discussion of member visibility appears earlier.

The function biggest selects from a set of subobjects that contain a member m the "dominating" definition. An example of a "dominating" member is set forth below where foo() in [D; D.B] dominates the foo() in [D; S].

An example of the method for computing a class hierarchy slice of the present invention is now presented with reference to the class hierarchy presented earlier in conjunction with the following C++ program:

```
[201]   void main(){
[202]       D d;  // Instantiation of class D
[203]       C* cp = (C*) &d; // Explicit cast from D to C
[204]       S* sp = cp; // Implicit cast from C to S
[205]       sp -> foo(); // Virtual member lookup
[206]   }
[207]   void S::bar(){ this->y = 20}; // Non-virtual member lookup
[208]   void S::foo(){ };
[209]   void B::foo(){ this->x = 10; }; // Non-virtual member lookup
[210]   void C::bar(){ this->foo(); }; // Virtual member lookup
```

Figure 7A:
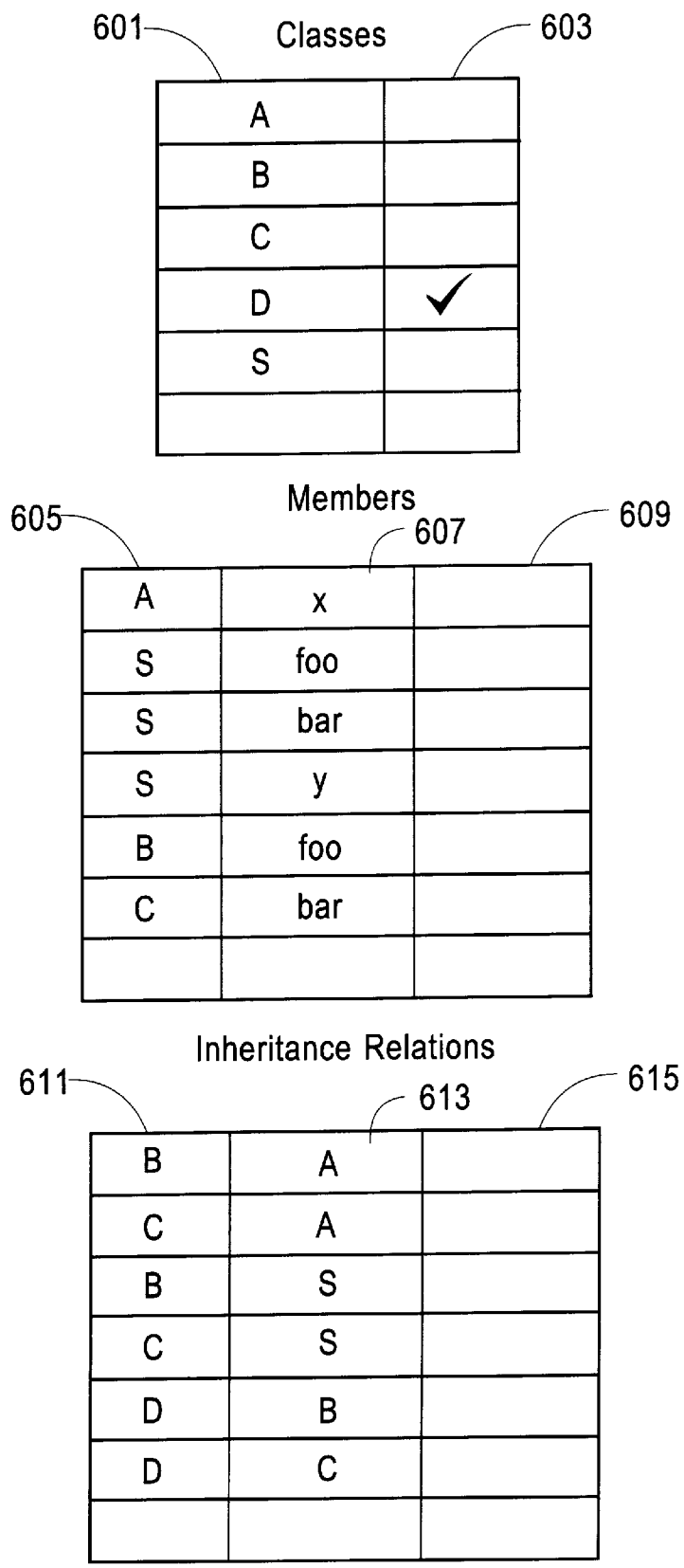

In this example, the statement D d of line [202] instantiates class D. No other class is instantiated anywhere in the program, and, hence, the first step of our algorithm would add class D to the class hierarchy slice (lines [3]–[5]). An example of the class hierarchy slice data at this stage is shown in FIG. 7(A).

Figure 7B:
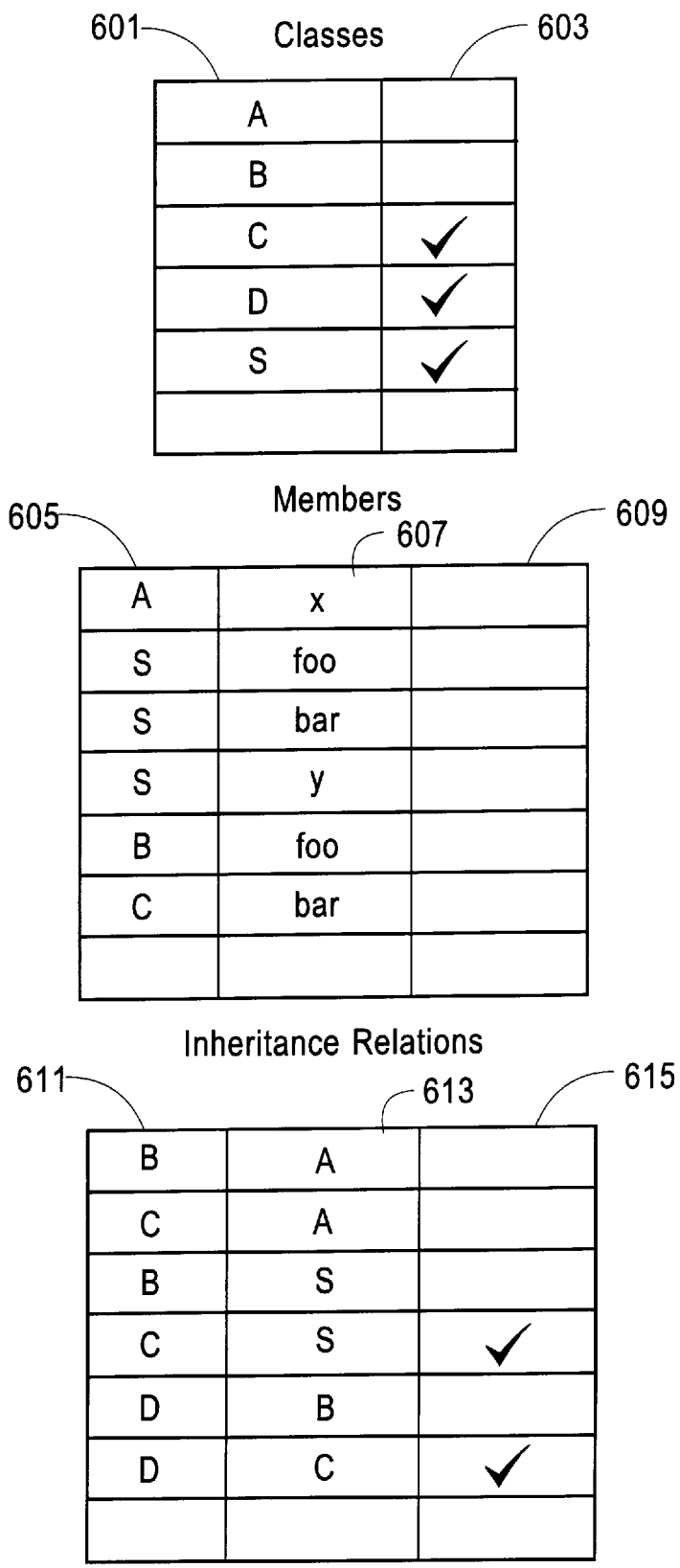

In addition, there are two typecasts in the program. Line [203] contains an explicit cast from the class D to the class C, while line [204] contains an implicit cast from class C to class S. To handle the first cast, the part of the class hierarchy that lies between classes D and C is added to the slice. In particular, the class C (class D was already added), as well as the inheritance relation between class D and C are added to the class hierarchy slice (lines [6]–[9]). To handle the second cast, class S (class C was already added) as well as the inheritance relation between class C and class S are added to the class hierarchy slice (lines [6]–[9]). An example of the class hierarchy slice data at this stage is shown in FIG. 7(B).

The final step in the algorithm is to examine every member lookup operation e.m or e→m in the program and identify the part of the class hierarchy that is necessary to preserve the behavior of that member lookup operation. There are several member lookup expressions in the example presented above.

Let us first consider the lookup expression this→x in function B::foo of line [209]. Assume that the type inference algorithm used identifies that the set of possible run-time types for expression "this" is {D}. The function CorrespondingSubObjects (lines [21]–[27]) will associate the subobject [D; D.B] with the "this" pointer. The class hierarchy slice associated with the member lookup for object [D; D.B] and member x is then computed as follows:

1. Line [102]. Function VisibleDefs is invoked with arguments [D; D.B] and member x.
2. Lines [121] to [131]. Function VisibleDefs cannot find a member x in class B, and goes "up" in the subobject graph to subobjects [D; D.B.A] and [D; S]. Only [D; D.B.A] contains a definition of x, so VisibleDefs returns the singleton set {[D; D.B.A]}.
3. Line [102]. Function biggest is invoked with the set {[D; D.B.A]} and returns the subobject [D; D.B.A]. Hence, n' is assigned [D; D.B.A].
4. Line [103]. the part of the hierarchy between subobjects [D; D.B] and [D; D.B.A] are added to the class hierarchy slice data. That is, the classes B and A, as well as the inheritance relation between them, are added to the class hierarchy slice data.
5. Lines [104] and [105]. the member x in class A is added to the class hierarchy slice data.
6. Lines [106] to [108]. In these lines, nothing more is added to the class hierarchy slice data since the set VisibleDefs contains only one element.
7. Lines [109] to [119]. Member x in class A is not a virtual method, so nothing more needs to be done.

Figure 7C:
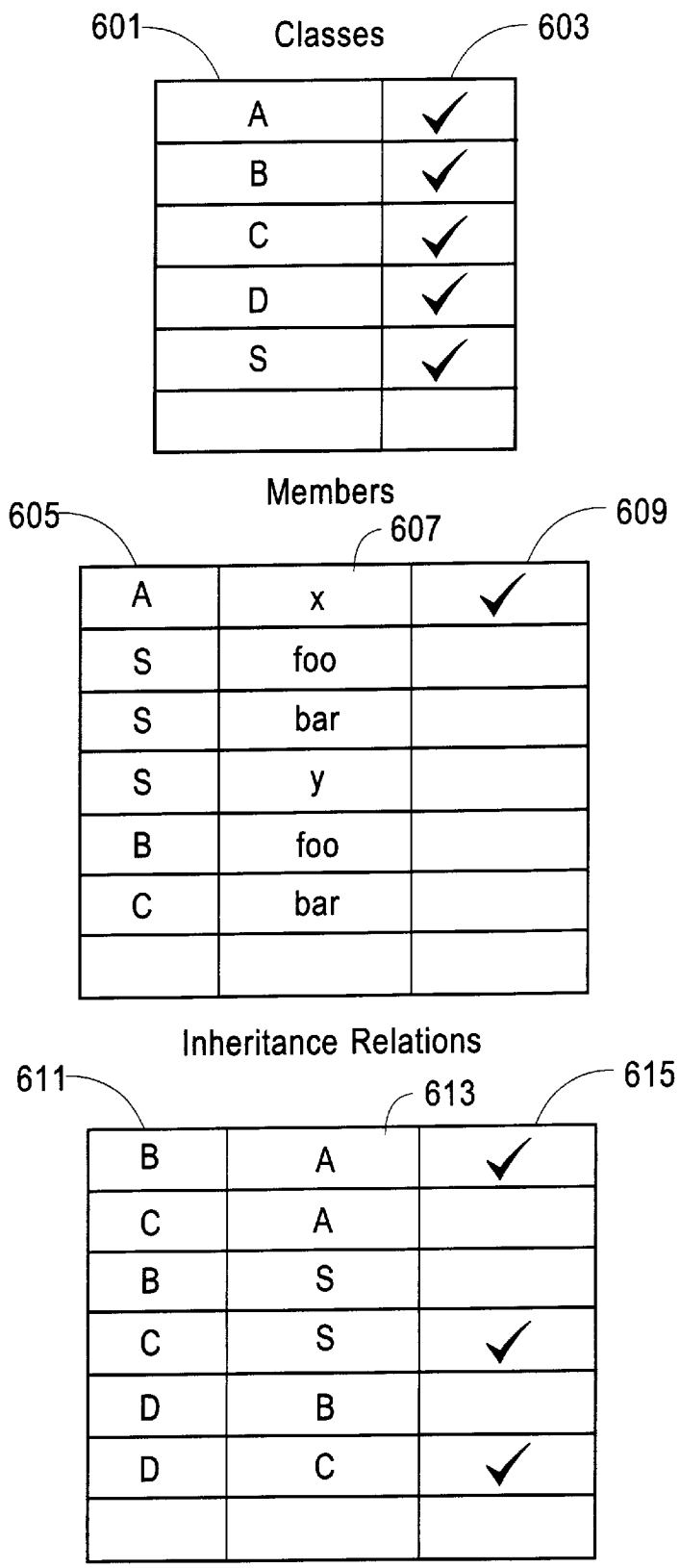

An example of the class hierarchy slice data at this stage is shown in FIG. 7(C).

Let us now consider the call to sp→foo() in line [205] of the main program. Assume that the type inference algorithm used identifies that the set of possible run-time types for expression "sp" is {D}. The function CorrespondingSubObjects (lines [21]–[27]) will associate the subobject [D; S] with the expression sp. The class hierarchy slice associated with the member lookup for object [D; S] and member foo() is then computed as follows:

1. Line [102]. Function VisibleDefs is invoked for [D; S] and member foo.
2. Lines [121]–[131]. Function VisibleDefs finds that there is one visible definition of foo, in subobject [D; S], and therefore returns the set {[D; S]}.
3. Line [102]. Function biggest is invoked with the set {[D; S]} and returns the subobject [D; S]. So, n' is set to [D; S].
4. Line [103]. the part of the class hierarchy between [D; S] and [D; S] is added to the class hierarchy slice data. This consists of just class S.
5. Lines [104]–[105]. the member foo of class S is added to the class hierarchy slice data.
6. Lines [106]–[108]. In these lines, nothing more is added to the class hierarchy slice data since the set VisibleDefs contains only one element.
7. Line [109]. Member foo() in class S is a virtual method, so lines [110] through [118] are executed.
8. Lines [110]–[111]. Determines n$_{full}$=[D; D]
9. Line [112]. Function VisibleDefs is invoked with arguments [D; D] and foo.
10. Lines [121] to [131]. Function VisibleDefs finds two visible definitions of foo, in subobjects [D; D.B] and [D; S], and returns the set {[D; S]; [D; D.B]}.
11. Line [112]. Function biggest is invoked for the set {[D; S]; [D; D.B]} and returns the subobject [D; D.B], so n' is set to [D; D.B].

12. Line [113]. the part of the class hierarchy that lies between subobjects [D; D] and [D; D.B] is added to the class hierarchy slice data. This consists of classes D and B. Classes D and B are already in the slice; the inheritance relation between the classes D and B is added to the slice.
13. Lines [114]–[115]. the member foo of class B is added to the class hierarchy slice data.
14. Lines [116]–[118]. the part of the class hierarchy that lies between subobjects [D; D.B] and [D; S] is added to slice. This consists of classes B and S. The classes B and S have already been added to the slice; yet the inheritance relation between the classes B and S is added to the slice.

There are two more member lookups in the example program (in lines [207] and [210]). However, these lookups will never be invoked during program execution and, hence, nothing more needs to be added to the class hierarchy slice data. The resulting class hierarchy slice is shown in FIG. 7(D).

In an alternate embodiment, if there are multiple inheritance paths between two classes, only one of these paths may be included in the class hierarchy slice data.

Figure 2:
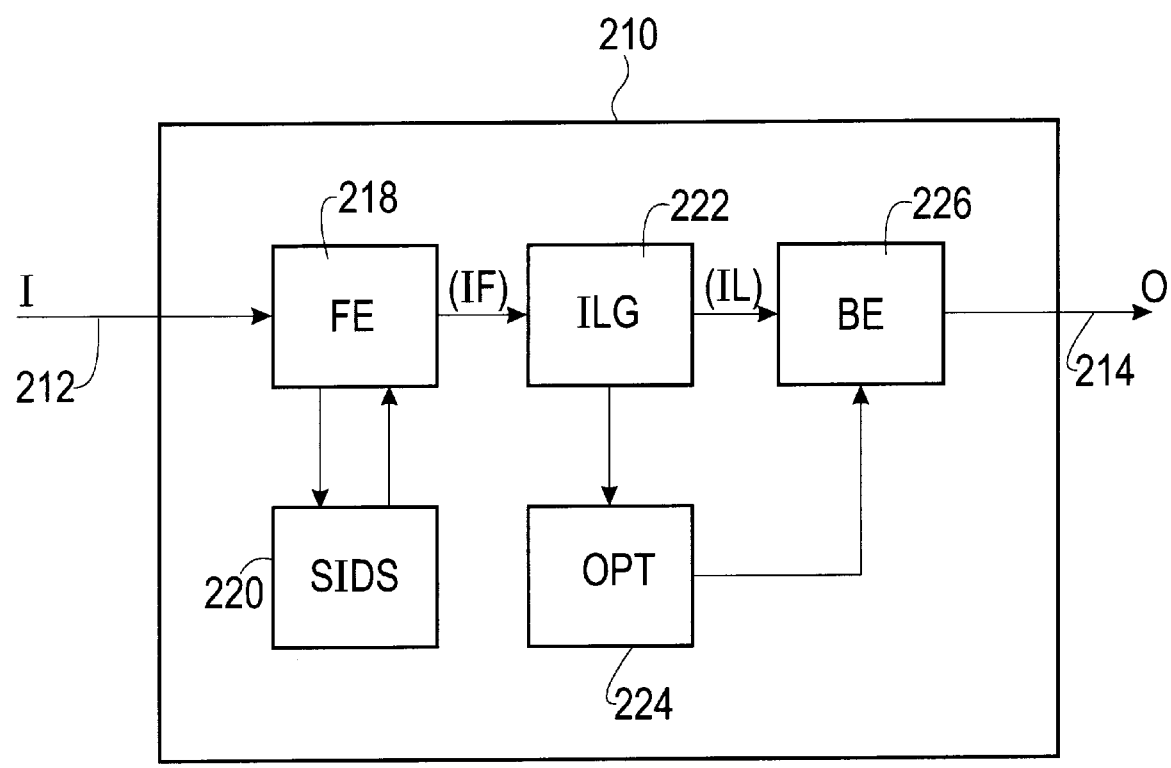
FIG. 2 is a block diagram of a compilation routine in which the subject invention may be implemented.

The class slicing technique of the present invention may be used in the compilation of program in order to reduce the space and time requirements of the program. The compilation process compiles a source program thereby generating a run-time representation of the source program. As shown in FIG. 2, the compilation process 210 accepts as an input (I) 212 a source program, and operates on it to an end of generating an output (O) 214 comprising a run-time representation of the source program. The run-time representation 210 is typically executable on a specific computer architecture. The compilation process 210 typically includes front end processing (FE) 218, a symbol table 220 for recording information about symbols in the input program, intermediate language generation (ILG) 222, optimization (OPT) 224, and back end processing (BE) 226.

The FE stage 218 typically converts the source program 212 to a (possibly) different internal form (IF) that may be conveyed to the ILG stage 222. As part of the preparation of the internal form, the FE stage 218 typically parses and performs semantic analysis on the source program 212. The front end processing may save information in, and possibly retrieve information from, the symbol information data structure(s) 220. These symbol information data structures, if they are used, may either be separate from or adjoined to the intermediate form. In addition, the FE stage 218 may perform optimization techniques such as program slicing techniques on the source program 212. Program slicing can be used to eliminate from the source program 212 those statements whose execution does not affect the observable behavior of the program. A more detailed description of program slicing may be found in F. Tip, "A Survey of Program Slicing Techniques", Journal of Programming Languages 3, 3 (1995), pp. 121–189, hereinafter incorporated by reference in its entirety.

The ILG stage 222 produces intermediate language instructions (IL) from the internal form of the program, possibly consulting the symbol table 220. The intermediate language form of the program may be conveyed to the BE stage 226 either directly or by way of the optimization stage 224. If the intermediate language (IL) form of the program is conveyed to the optimization stage 224, then the optimization stage 224 produces a functionally equivalent and preferably faster or smaller version of the program, typically again in the intermediate form. This version of the program may then be conveyed to the BE stage 226. To this end, the optimization stage 224 may be in communication with the symbol table 220. Once an intermediate language form of the program is received by the BE stage 226, either directly or after optimization, the BE stage 226 generates executable code that is functionally equivalent to the intermediate language form of the program. In addition, for object oriented programming languages, the BE stage 226 implements an object model and generates code that implements the object oriented features used by the source program 212. In addition, the BE stage 226 may optimize the generated code. The executable code generated by the BE stage 226 is a run-time representation of the source program. and is typically compatible with a specific computer architecture, for example the Windows®-Intel® architecture or a virtual machine architecture such as the architecture specified for the JAVA™ virtual machine. The constitutions and functions of these elements are well known in the art and will not be otherwise described here. For example, further description on the various intermediate language generators and other functionality of the compiler may be found in A. V. Aho et al., "Compilers Principles, Techniques and Tools, Addison-Wesley, 1986.

The class slicing technique of the present invention is preferably integrated into the front end processing stage 218 of the compilation process 210 presented above thereby eliminating classes, members, and inheritance relations that are not necessary for the execution of the program P. The class slicing technique of the present invention is preferably performed subsequent to an operation that removes from the program code whose execution does not affect the observable execution behavior of the program. An example of such an operation is a program slicing operation. Program slicing can be used to eliminate from the source program 212 those statements whose execution does not affect the observable behavior of the program. A more detailed description of program slicing may be found in F. Tip, "A Survey of Program Slicing Techniques", Journal of Programming Languages 3, 3 (1995), pp. 121–189, incorporated by reference above in its entirety.

In an alternate embodiment, the class slicing technique of the present invention may be performed on a source program, thereby generating an optimized source program. In this case, the optimized source would be supplied as input 212 to the compilation process 210.

By eliminating parts of class hierarchies such as classes, members, and inheritance relations, objects become smaller and require less memory. In particular, when an inheritance relation between a base class X and a derived class Y is omitted, the corresponding X subobject in the Y object will be omitted at execution time. Time requirements are also reduced due to reduced object creation/deletion time, and cache effects. In addition, eliminating parts of a class hierarchy may enable the compilation process to perform other optimizations such as virtual-call elimination (i.e., replacing virtual method calls by direct method calls) and virtual inheritance elimination (i.e., replacing virtual inheritance by nonvirtual inheritance) that could previously not be applied.

The class slicing mechanism of the present invention may also be integrated into a software application for program understanding and debugging. Preferably, the class slicing mechanism of the present invention is utilized in conjunction with an operation that removes from the program any code whose execution does not affect the observable execution behavior of the program. An example of such an operation is a program slicing operation, details of which is described earlier. Class hierarchy slicing extends the applicability of program slicing to object-oriented languages by indicating which parts of a class hierarcy are used in obtaining a value computed at some point of interest in a program.

Figure 8:
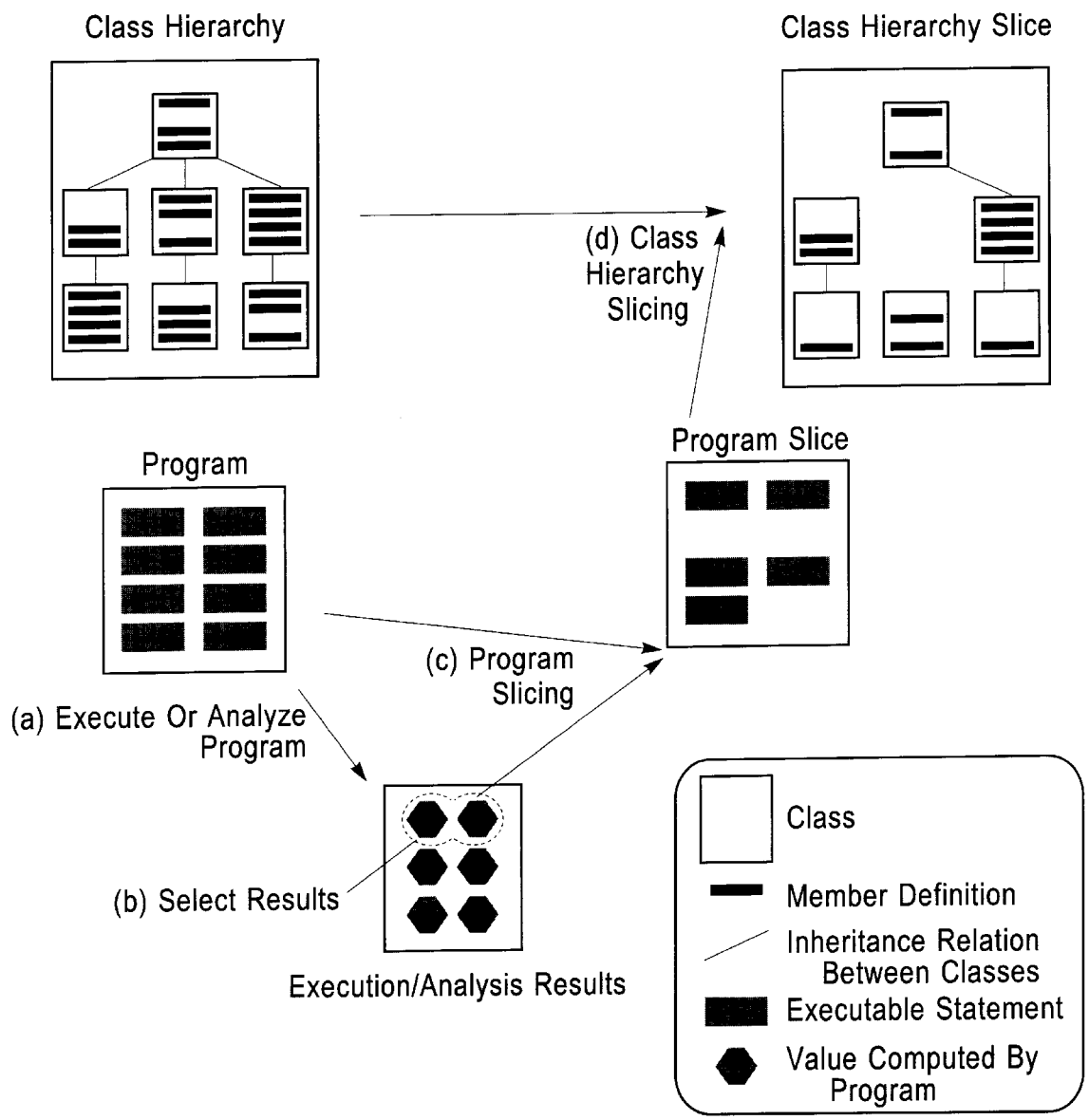
FIG. 8 illustrates a software application for program understanding that utilizes the class slicing technique of the present invention.

FIG. 8 illustrates an example of the class slicing technique used for program -understanding. More specifically, in step (a), a program is executed and analyzed, yielding a set of values or representations of values. In step (b), one or more analysis results (e.g, values of variables) are selected by a user. For example, a variable that has an incorrect value can be selected. In step (c), a program slicing algorithm may be used to determine the set of statements that contribute to the results selected in step (b). Finally, in step (d), the class hierarchy slicing technique of the present invention is used to determine the parts of the class hierarchy that are used (or not used) for obtaining the execution/analysis results selected in step (b), and the user is notified of the parts of the class hierarchy that are used (or not used) for obtaining such execution/analysis results.

While the invention has been described above with respect to particular embodiments thereof, those skilled in the art will recognize that the invention can be practiced with modification within the spirit and scope of the appended claims.

We claim:

1. In a system wherein a computer program has a class hierarchy comprising a plurality of components including classes of objects, a method for generating a run-time representation of said computer program, the method comprising the steps of:
   i) identifying a first class of objects and a second class of objects, wherein said first class inherits from said second class, said second class being known as a base class and said first class being known as a derived class, and wherein components of said class hierarchy include an inheritance relation that identifies said second class as a base class with respect to said first class and that identifies said first class as a derived class with respect to said second class, wherein each object within said first class of objects includes an object of said second class as a subobject, and wherein for any object O of said first class of objects, said subobject of O belonging to the said second class of objects is not accessed during any execution of said computer program;
   ii) generating said run-time representation of said computer program that includes said first class of objects yet omits said inheritance relation between said first class and said second class; and
   wherein said step i) includes the step of examining components of said class hierarchy.

2. The method of claim 1, wherein omitting said inheritance relation between said first class and said second class results in omission from every object belonging to said first class a corresponding subobject belonging to said second class.

3. The method of claim 1, wherein said first class of objects of said computer program inherits from multiple classes of objects.

4. The method of claim 1, wherein said first class of objects of said computer program virtually inherits from said second class of objects.

5. In a system wherein a computer program has a class hierarchy comprising a plurality of components including classes of objects, a method for generating information characterizing said computer program, the method comprising the steps of:
   i) identifying a first class of objects and a second class of objects, wherein said first class inherits from said second class, said second class being known as a base class and said first class being known as a derived class, and wherein components of said class hierarchy include an inheritance relation that identifies said second class as a base class with respect to said first class and that identifies said first class as a derived class with respect to said second class, wherein each object within said first class of objects includes an object of said second class as a subobject, and wherein for any object O of said first class of objects, said subobject of O belonging to the said second class of objects is not accessed during any execution of said computer program;
   ii) notifying a user that objects of the said first class may be created and accessed during execution, but that said subobject representing said second class is never accessed during any execution of said computer program;
   wherein said step i) includes the step of examining components of said class hierarchy.

6. The method of claim 5, wherein said first class of objects of said computer program inherits from multiple classes of objects.

7. The method of claim 5, wherein said first class of objects of said computer program virtually inherits from said second class of objects.

8. In a system wherein a computer program has a class hierarchy comprising a plurality of components including classes of objects and members of said classes, a method for generating a run-time representation of said computer program, the method comprising the steps of:
   i) identifying at least one member m of said members of said computer program, wherein said member m is not accessed during any execution of said computer program; and
   ii) generating a run-time representation of said computer program that omits said member m;
   wherein step i) includes the step of examining components of said class hierarchy;
   wherein step ii) includes the steps of:
   iii) identifying a set of all members MT of said class hierarchy of said computer program;
   iv) identifying a set of members M of said class hierarchy of said computer program, wherein each member within said set M may be accessed during some execution of said computer program; and
   v) identifying all members of said computer program that are not accessed during any execution of said computer program as those members belonging to the set MT yet omitted from the set M;
   further comprising the step of:
   vi) identifying a first class of objects and a second class of objects, wherein said first class inherits from said second class, said second class being known as a base class and said first class being known as a derived class, and wherein components of said class hierarchy include an inheritance relation that identifies said second class as a base class with respect to said first class and that identifies said first class as a derived class with respect to said second class, wherein each object within said first class of objects includes an object of said second class as a subobject, and wherein for any object O of said first class of objects, said subobject of O belonging to the said second class of objects is not accessed during any execution of said computer program;
   wherein said step ii) generates said run-time representation of said computer program that includes said first class of objects yet omits said inheritance relation between said first class and said second class; and wherein said step vi) includes the step of examining components of said class hierarchy.

9. The method of claim 8, further comprising the steps of:

identifying in said computer program at least one member lookup operation wherein a member m1 is accessed from an expression e; and identifying components of said class hierarchy that are necessary to preserve execution behavior of said member lookup operation.

10. The method of claim 9, further comprising the steps of:

identifying a first set of subobjects that e may denote during execution of said member lookup operation; and for each subobject n within said first set of subobjects,
identifying a second set of subobjects contained within said subobject n that contains a visible definition of said member m1,
identifying a dominant subobject n' in said second set of subobjects,
identifying a least derived class C for said dominant subobject n', and
adding member m1 belonging to said least derived class C to said set of members M; and
if member m1 belonging to said least derived class C is a virtual method,
identifying a most derived class D for said subobject n,
identifying a full subobject corresponding to said most derived class D,
identifying a third set of subobjects contained within said full subobject that contain a visible definition of said member m1,
identifying a dominant subobject n1' in said third set of subobjects,
identifying a least derived class C1 for said dominant subobject n1', and
adding member m1 belonging to said least derived class C1 to said set of members M.

11. The method of claim 8, wherein omitting said inheritance relation between said first class and said second class results in omission from every object belonging to said first class a corresponding subobject belonging to said second class.

12. The method of claim 8, wherein said first class of objects of said computer program inherits from multiple classes of objects.

13. The method of claim 8, wherein said first class of objects of said computer program virtually inherits from said second class of objects.

14. A program storage device readable by a machine, tangibly embodying a computer program executable by said machine to perform a method for generating a run-time representation of said computer program, wherein said computer program has a class hierarchy comprising a plurality of components including classes of objects, said method comprising the steps of:

i) identifying a first class of objects and a second class of objects, wherein said first class inherits from said second class, said second class being known as a base class and said first class being known as a derived class, and wherein components of said class hierarchy include an inheritance relation that identifies said second class as a base class with respect to said first class and that identifies said first class as a derived class with respect to said second class, wherein each object within said first class of objects includes an object of said second class as a subobject, and wherein for any object O of said first class of objects, said subobject of O belonging to the said second class of objects is not accessed during any execution of said computer program;

ii) generating said run-time representation of said computer program that includes said first class of objects yet omits said inheritance relation between said first class and said second class; and wherein said step i) includes the step of examining components of said class hierarchy.

15. The program storage device of claim 14, wherein omitting said inheritance relation between said first class and said second class results in omission from every object belonging to said first class a corresponding subobject belonging to said second class.

16. The program storage device of claim 14, wherein said first class of objects of said computer program inherits from multiple classes of objects.

17. The program storage device of claim 14, wherein said first class of objects of said computer program virtually inherits from said second class of objects.

18. A program storage device readable by a machine, tangibly embodying a program executable by said machine to perform a method for generating information characterizing a computer program having a class hierarchy comprising a plurality of components including classes of objects, the method comprising the steps of:

i) identifying a first class of objects and a second class of objects, wherein said first class inherits from said second class, said second class being known as a base class and said first class being known as a derived class, and wherein components of said class hierarchy include an inheritance relation that identifies said second class as a base class with respect to said first class and that identifies said first class as a derived class with respect to said second class, wherein each object within said first class of objects includes an object of said second class as a subobject, and wherein for any object O of said first class of objects, said subobject of O belonging to the said second class of objects is not accessed during any execution of said computer program;

ii) notifying a user that objects of the said first class may be created and accessed during execution, but that said subobject representing said second class is never accessed during any execution of said computer program;

wherein said step i) includes the step of examining components of said class hierarchy.

19. The program storage device of claim 18, wherein said first class of objects of said computer program inherits from multiple classes of objects.

20. The program storage device of claim 18, wherein said first class of objects of said computer program virtually inherits from said second class of objects.

21. A program storage device readable by a machine, tangibly embodying a computer program executable by said machine to perform a method for generating a run-time representation of said computer program, wherein said computer program has a class hierarchy comprising a plurality of components including classes of objects and members of said classes, said method comprising the steps of:

i) identifying at least one member m of said members of said computer program, wherein said member m is not accessed during any execution of said computer program; and ii) generating a run-time representation of said computer program that omits said member m;

wherein step i) includes the step of examining components of said class hierarchy;

wherein step ii) includes the steps of:

iii) identifying a set of all members MT of said class hierarchy of said computer program;

iv) identifying a set of members M of said class hierarchy of said computer program, wherein each member within said set M may be accessed during some execution of said computer program; and v) identifying all members of said computer program that are not accessed during any execution of said computer program as those members belonging to the set MT yet omitted from the set M;

further comprising the step of:

vi) identifying a first class of objects and a second class of objects, wherein said first class inherits from said second class, said second class being known as a base class and said first class being known as a derived class, and wherein components of said class hierarchy include an inheritance relation that identifies said second class as a base class with respect to said first class and that identifies said first class as a derived class with respect to said second class, wherein each object within said first class of objects includes an object of said second class as a subobject, and wherein for any object O of said first class of objects, said subobject of O belonging to the said second class of objects is not accessed during any execution of said computer program;

wherein said step ii) generates said run-time representation of said computer program that includes said first class of objects yet omits said inheritance relation between said first class and said second class; and wherein said step vi) includes the step of examining components of said class hierarchy.

22. The program storage device of claim 21, further comprising the steps of:

identifying in said computer program at least one member lookup operation wherein a member m1 is accessed from an expression e; and identifying components of said class hierarchy that are necessary to preserve execution behavior of said member lookup operation.

23. The program storage device of claim 22, further comprising the steps of:

identifying a first set of subobjects that e may denote during execution of said member lookup operation; and for each subobject n within said first set of subobjects, identifying a second set of subobjects contained within said subobject n that contains a visible definition of said member m1, identifying a dominant subobject n' in said second set of subobjects, identifying a least derived class C for said dominant subobject n', and adding member m1 belonging to said least derived class C to said set of members M; and if member m1 belonging to said least derived class C is a virtual method, identifying a most derived class D for said subobject n, identifying a full subobject corresponding to said most derived class D, identifying a third set of subobjects contained within said full subobject that contain a visible definition of said member m1, identifying a dominant subobject n1' in said third set of subobjects, identifying a least derived class C1 for said dominant subobject n1', and adding member m1 belonging to said least derived class C1 to said set of members M.

24. The program storage device of claim 21, wherein omitting said inheritance relation between said first class and said second class results in omission from every object belonging to said first class a corresponding subobject belonging to said second class.

25. The program storage device of claim 21, wherein said first class of objects of said computer program inherits from multiple classes of objects.

26. The program storage device of claim 21, wherein said first class of objects of said computer program virtually inherits from said second class of objects.

* * * * *